United States Patent
Schmeisl

[11] Patent Number: 5,944,325
[45] Date of Patent: Aug. 31, 1999

[54] MECHANICALLY ACTUATED HYDROSTATIC TOOL HOLDER

[75] Inventor: John P. Schmeisl, Fraser, Mich.

[73] Assignee: Hydra-Lock Corporation, Mt. Clemens, Mich.

[21] Appl. No.: 08/969,394

[22] Filed: Nov. 13, 1997

[51] Int. Cl.$^6$ ................................................. B23B 31/30
[52] U.S. Cl. ........................................ 279/4.03; 279/4.05
[58] Field of Search .................................. 279/4.03, 4.04, 279/2.08, 4.05, 139

[56] References Cited

U.S. PATENT DOCUMENTS

| | | | |
|---|---|---|---|
| 2,318,838 | 5/1943 | Conradson | 279/2.08 |
| 2,744,456 | 5/1956 | Atherholt, Sr. et al. | 279/4.03 |
| 2,797,604 | 7/1957 | Atherholt et al. | 279/4.03 |
| 3,677,559 | 7/1972 | Andre et al. | 279/4.03 |
| 5,249,815 | 10/1993 | Beere | 279/4.04 |
| 5,429,376 | 7/1995 | Mueller et al. | 279/4.03 |
| 5,516,243 | 5/1996 | Laube | 408/239 R |
| 5,711,538 | 1/1998 | Retzbach et al. | 279/4.03 |

FOREIGN PATENT DOCUMENTS

| | | | |
|---|---|---|---|
| 48303 | 3/1983 | European Pat. Off. | 279/4.03 |

Primary Examiner—Daniel W. Howell
Assistant Examiner—Rouzbeh Tabaddor
Attorney, Agent, or Firm—Barnes, Kisselle, Raisch, Choate, Whittemore & Hulbert, P.C.

[57] ABSTRACT

A collet for holding and precisely locating a cutting tool within a tool holder has a bore constructed to receive a shank of the cutting tool therein, a hydrostatically displacable sleeve received in the bore, a piston received within a passage communicating with the sleeve and displaceable to pressurize fluid within the passage to actuate the sleeve and a retaining nut threadably received on the tool holder to displace the piston to pressurize the fluid within the collet as the nut is rotated on the tool holder. The pressurized fluid within the collet acts substantially uniformly across the sleeve to urge the sleeve into firm engagement with the cutting tool to firmly hold and accurately and repeatably locate the cutting tool within the collet. Also, the pressurized fluid acts substantially uniformly on the interior wall of the collet to substantially uniformly urge the collet into firm engagement with the tool holder to firmly hold and accurately and repeatably locate the collet within the tool holder. The hydrostatic force generated to both hold the cutting tool within the collet and to hold the collet within the tool holder is produced by the single action of rotating the retaining nut on the tool holder to displace the piston and pressurize the fluid within the collet.

11 Claims, 2 Drawing Sheets

5,944,325

MECHANICALLY ACTUATED HYDROSTATIC TOOL HOLDER

FIELD OF THE INVENTION

This invention relates generally to machine cutting tools and more particularly to a hydrostatic tool holder.

BACKGROUND OF THE INVENTION

Hydrostatic holding devices have been used for a number of years to hold work parts which are to be machined or ground. Similarly, U.S. Pat. No. 5,516,243 discloses a cutting tool holder with an elongate, contracting hydrostatic sleeve to grip a shank of a tool during use. A chuck which receives the tool holder may have a second hydrostatic sleeve which is separately and independently actuated to hold and locate the tool holder. Each hydrostatic sleeve is actuated by a separate screw plunger threaded in a recess and threadably displaced to pressurize a fluid within a chamber adjacent the sleeve.

For many years conventional tool holding collets with mechanically actuated gripping fingers have been utilized in a wide variety of applications. However, there is still a need for hydrostatic tool and workpiece holding collets and particularly a hydrostatic collet insertable in a conventional mechanical collet carrier body.

SUMMARY OF THE INVENTION

A collet for holding and precisely locating a cutting tool within a tool holder has a hydrostatic, contracting sleeve with a bore constructed to receive a shank of the cutting tool therein, a piston received within a passage communicating with the sleeve and displaceable to pressurize fluid within the passage to actuate the sleeve and a retaining nut threadably received on the tool holder to displace the piston to pressurize the fluid within the collet as the nut is rotated on the tool holder. The pressurized fluid within the collet acts substantially uniformly across the sleeve to urge the sleeve into firm engagement with the cutting tool to firmly hold and accurately and repeatably locate the cutting tool within the collet. Also, the pressurized fluid acts substantially uniformly on the interior wall of the collet to substantially uniformly expand the collet within the tool holder bore to firmly hold and accurately and repeatably locate the collet within the tool holder. The hydrostatic force generated to both hold the cutting tool within the collet and to hold the collet within the tool holder is produced by the single action of rotating the retaining nut on the tool holder to displace the piston and pressurize the fluid within the collet.

Objects, features and advantages of this invention include providing a collet which utilizes a fluid under pressure to both hold the collet within a tool holder and to hold a cutting tool within the collet, precisely and repeatably locates a cutting tool within the collet, precisely and repeatably locates the collet within the tool holder, provides ample force holding the cutting tool within the collet and the collet within the tool holder, dampens vibrations generated in use, extends the life of the machine tool by eliminating the vibration in use, is interchangeable to enable different collets and different machine tools to be used in the same tool holder, maintains ample force holding the collet within the tool holder and the cutting tool within the collet even at high rotational speeds of the tool holder, may be used in standard tool holders, is reliable, durable, effective and of a relatively simple design and economical manufacture and has a long, useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figures 1, 2:
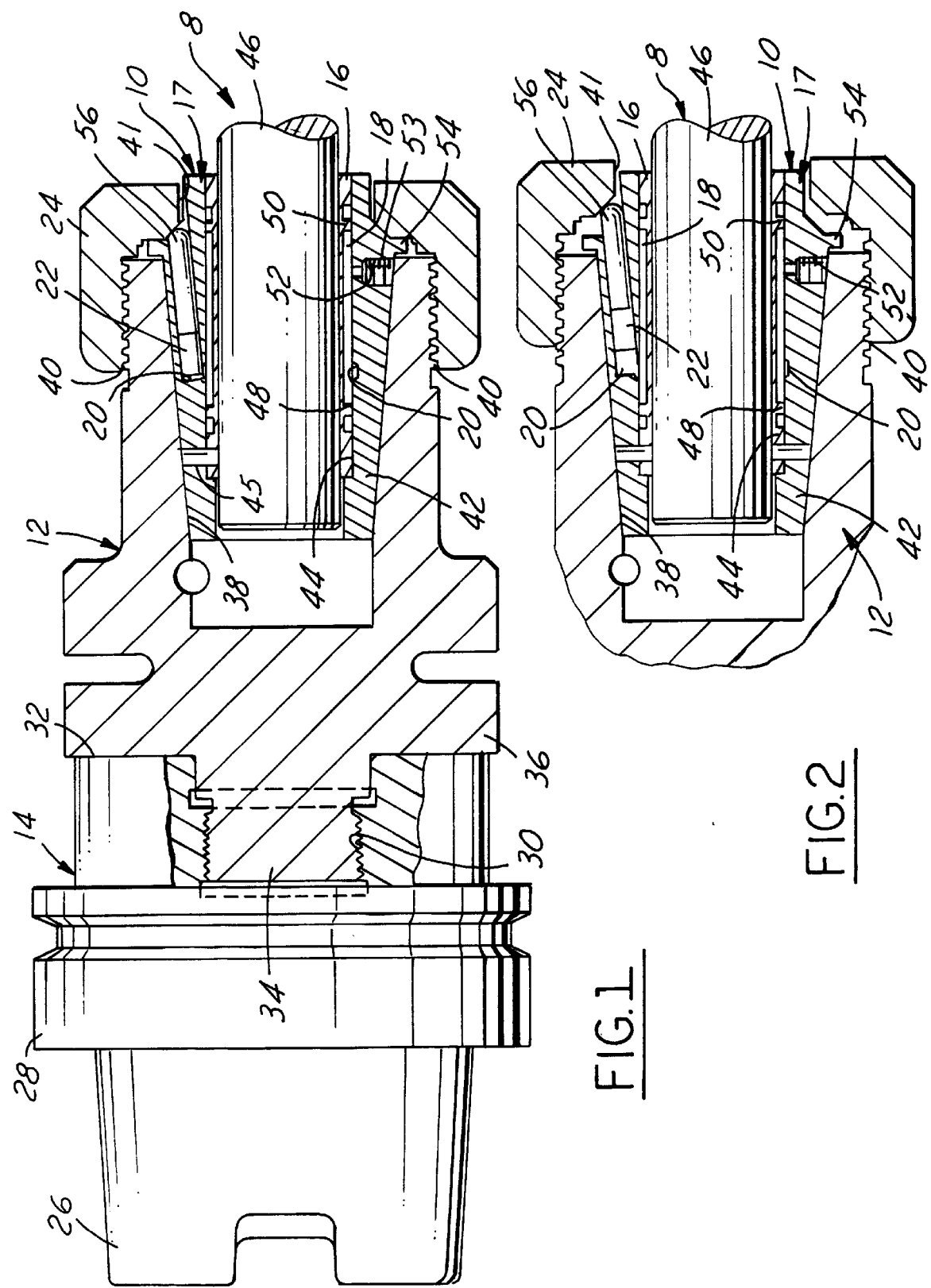
FIG. 1 is a sectional view illustrating a cutting tool received within a collet embodying the present invention and received within a tool holder.
FIG. 2 is a partial sectional view of the cutting tool, collet and tool holder of FIG. 1 with the retaining nut of the collet backed off slightly to reduce the pressure of the fluid within the collet.

Referring in more detail to the drawings, FIGS. 1 and 2 illustrate a cutting tool 8 received in a collet assembly 10 received in a tool holder 12 carried by a chuck 14 which may be driven by a spindle of a machine tool for machining a workpiece. The collet assembly 10 has a hydrostatically actuated contracting sleeve 16 which, with a collet body 17, defines an annular fluid chamber 18 constructed to be filled with fluid under pressure to urge the sleeve 16 into engagement with the cutting tool 8 to firmly hold and accurately and repeatably locate the cutting tool 8 within the collet 10 and to also expand the collet body 17 into firm engagement with the tool holder 12 to firmly hold and accurately and repeatably locate the collet 10 within the tool holder 12. The chamber 18 communicates with a pair of passage 20, 21 which are also filled with fluid and in which a separate piston 22 is slidably received in each for reciprocation and displaced by a retaining nut 24 threadably received on the tool holder 12. When the retaining nut 24 is rotated and further received on the tool holder 12, both pistons 22 are displaced to decrease the volume of the passages 20, 21 and thereby increase the pressure of the fluid within the chamber 18 and both contract the sleeve 16 onto the cutting tool 8 and expand the collet body 17 within the tool holder 12.

The chuck 14 has a tapered circular projection 26 constructed and arranged to be received within a central recess of a machine spindle and has a radially extending flange 28 which may be bolted or otherwise secured to the face of the spindle to attach and locate the chuck 14 to the spindle. The chuck 14 has an internally threaded bore 30 which opens into a machined flat face 32 which facilitates locating and aligning the tool holder 12 on the chuck 14.

The tool holder 12 has an externally threaded end portion 34 received in the bore 30 of the chuck 14 and a radially extending flange 36 machined flat and constructed to engage the flat face 32 of the chuck 14 to align and locate the tool holder 12. The tool holder 12 has a tapered bore 38 open at one end and constructed to receive the collet body 17. External threads 40 on the machine tool holder 12 are constructed to receive the retaining nut 24. The nut 24 is annular with a central opening 41 through which the cutting tool 8 projects.

The collet body 17 has a tapered side wall 42 complementarily shaped to the tapered bore 38 of the tool holder 12 to accurately align the collet body 17 therein. The collet body 17 also has a cylindrical internal counter bore 44 constructed to receive the sleeve 16 which is axially retained in the bore 44 by pins 45 and has sealing grooves 48, 50 at each end with suitable O-rings or other sealing devices therein to prevent leakage of the fluid from the chamber 18. The chamber 18 is annular and circumferentially continuous so that the fluid therein acts evenly across the adjacent portions of the sleeve 16 and the collet body 17. The fluid is preferably a viscous hydraulic fluid or a heavy grease substantially completely filling the passages 20, 21 and chamber 18. A fill and relief passage 52 is provided in the collet body 17 through which the fluid may be supplied to the collet assembly 10 or drained therefrom and is preferably closed by a suitable plug 53 in use. A radially outwardly extending flange 54 of the collet body 17 may be provided to engage the nut 24 and may limit the travel of the retaining nut 24 relative to the collet body 17 to thereby limit the maximum fluid pressure generated within the chamber 18.

Figure 4:
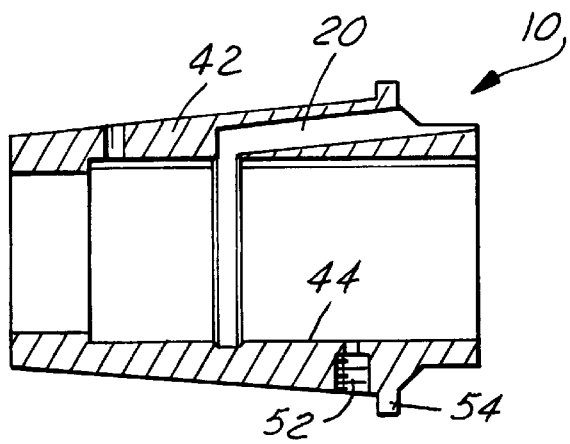
FIG. 4 is a cross sectional view taken along line 4—4 of FIG. 3.
Figure 3:
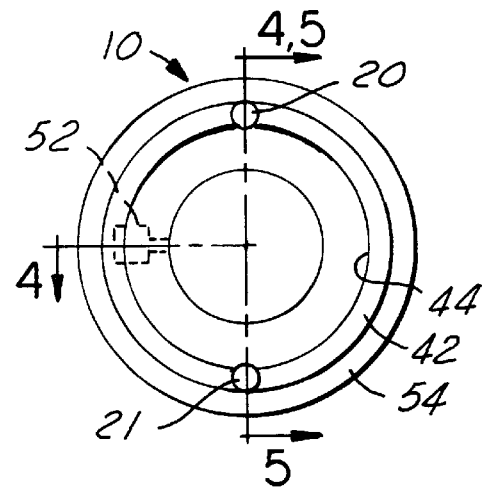
FIG. 3 is an end view of the collet.
Figure 5:
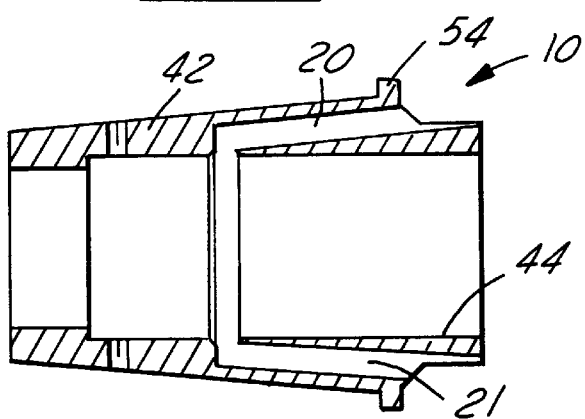
FIG. 5 is a cross sectional view taken along line 5—5 of FIG. 3.

As shown in FIGS. 3–5, the passages 20, 21 are preferably diametrically opposed with each communicating with the chamber 18 and with each other, through the chamber 18, to provide a substantially uniform fluid pressure in the collet 10. Preferably a separate pin 56 is provided between each piston 22 and the nut 24 to transmit the force from the nut 24 to the pistons 22 received in the passages 20, 21. However the piston may be integral with the pin. Preferably each pin 56 has a free end which is semispherical and extends exteriorly of its passage 20, 21 and the pins are of the same length so that they are generally equally acted on by the nut 24 and more evenly load the nut 24. In some applications, a single passage 20 and piston 22 may be sufficient to generate the fluid pressure within the chamber 18. However, providing a pair of pistons 22 may provide an increased fluid pressure per increment of linear displacement of the retaining nut 24 and more evenly loads the nut 24 to facilitate rotating the nut 24.

Preferably, although not necessarily, the tool holder 12 and nut 24 are of a construction, configuration and size of a conventional commercially available mechanical collet assembly so that the hydrostatic collet assembly 10 can be inserted and used therein in lieu of the mechanical collet mechanism previously disposed in the holder 12 and actuated by the nut 24.

OPERATION

In use, the tool holder 12 is inserted into the chuck 14 which is received in the machine spindle which drives the assembly for rotation. The collet 10 is received within the tapered bore 38 of the tool holder 12 and the shank 46 of the cutting tool 8 is received within the sleeve 16 in the bore 44 of the collet 10. The retaining nut 24 is received over the collet 10 adjacent the open end of the tool holder 12 and is rotated on the threaded portion 40 of the tool holder 12 until the nut 24 bears on the pins 56 to displace the pins and pistons 22 within the passages 20, 21 and thereby increase the pressure of the fluid within the passages 20, 21 and the chamber 18. As the nut 24 is further rotated, the pistons 22 are further displaced and the pressure of the fluid within the chamber 18 is increased. Under sufficient pressure, the sleeve 16 surrounding the shank 46 is forced radially inward and grips the shank 46 to fly hold and accurately align the cutting tool 8 within the collet 10. Under sufficient pressure, the collet body side wall 42 will be forced radially outward to firmly engage and accurately locate the collet 10 within the tool holder 12.

To remove the collet 10 from the tool holder 12, the retaining nut 24 is rotated in the direction to remove it from the tool holder 12. The pressurized fluid displaces the pistons 22 as the retaining nut 24 is moved so that the volume of the passages 20, 21 is increased as the retaining nut 24 is removed from the machine tool holder to thereby reduce the pressure within the passages 20, 21 and chamber 18. When the pressure drops sufficiently, the sleeve 16 will move radially outward towards its unloaded position thereby loosening its hold on the cutting tool 8 so that the cutting tool 8 may be removed. As the pressure decreases, the collet body will also move radially inward towards its unloaded position whereby it may be removed from the tool holder 12 if desired.

Thus, the hydrostatic collet 10 may be used with a standard tool holder 12 to hydrostatically hold and precisely locate a cutting tool 8 therein. The single action required to both firmly hold the collet 10 within the tool holder 12 and the cutting tool 8 within the collet 10 enables fast replacement of the cutting tool 8 or the collet 10, or both, to provide a flexible, interchangeable and efficient machine tool holder. Further, the hydrostatic retention of the cutting tool 8 in the collet 10 reduces the vibration and chatter produced during machining which increases the service life of the cutting tool and enhances its performance in use.

I claim:

1. An apparatus to releasably retain a tool having a central shank comprising:
    a holder having a bore therein and a threaded portion at one end thereof;
    a body;
    a central bore in the body;
    a pressure sleeve received in the central bore and constructed to receive the shank of the tool therein;
    an annular chamber defined between the sleeve and the body and constructed to receive a fluid therein;
    at least one fluid pressurizing member communicating with the chamber to pressurize fluid in the chamber; and
    an actuator threadably received on the threaded portion of the holder and moveable relative to and capable of displacing each fluid pressurizing member whereby displacement of each fluid pressurizing member pressurizes fluid in the chamber to urge the sleeve into engagement with the shank of the tool to hold the tool in the body and urges the body into engagement with the holder.

2. The apparatus of claim 1 wherein each of the at least one fluid pressurizing members is a piston and the actuator is a nut threadably received on the holder.

3. The apparatus of claim 2 which also comprises at least one passage in the body, each passage communicating with the chamber and constructed to slidably receive a piston.

4. The apparatus of claim 2 wherein two pistons are provided.

5. The apparatus of claim 4 wherein the pistons are diametrically opposed and independently engageable by the nut.

6. The apparatus of claim 1 wherein the body is tapered or generally frustoconical and the bore of the holder is complementarily shaped.

7. The apparatus of claim 1 wherein the sleeve is generally cylindrical and the shank of the tool is also generally cylindrical.

8. The apparatus of claim 1 which also comprises a passage in the body in communication with the chamber through which the fluid may be provided into or drained from the chamber.

9. A collet to releasably retain a tool having a central shank and constructed to be received within a bore of a tool holder which has a threaded portion at one end thereof comprising:

a body;

a central bore in the body;

a deflectable sleeve received in the central bore and constructed to receive the shank of the tool therein;

an annular chamber defined between the sleeve and the body and constructed to receive a fluid therein;

at least one piston communicating with the chamber to pressurize fluid in the chamber; and a nut received on the threaded portion of the tool holder and engageable with each piston to displace each piston and thereby pressurize the fluid in the chamber whereby the pressurized fluid in the chamber urges the sleeve into engagement with the shank of the tool to hold the tool in the collet and urges the body into engagement with the tool holder.

10. An apparatus to releasably retain a tool having a central shank and constructed to be received within a bore of a holder which has a threaded portion at one end thereof comprising:

a body;

a central bore in the body;

a pressure sleeve received in the central bore and constructed to receive the shank of the tool therein;

an annular chamber defined between the sleeve and the body and constructed to receive a fluid therein;

at least one fluid pressurizing member communicating with the chamber to pressurize fluid in the chamber; and an actuator threadably received on the threaded portion of the holder and moveable relative to and capable of displacing each fluid pressurizing member whereby displacement of each fluid pressurizing member pressurizes fluid in the chamber to urge the sleeve into engagement with the shank of the tool to hold the tool in the body and urges the body into engagement with the holder.

11. The apparatus of claim 10 wherein each of the at least one fluid pressurizing members is a piston and the actuator is a nut threadably received on the holder.

* * * * *